United States Patent
Lee

(10) Patent No.: US 9,166,754 B2
(45) Date of Patent: Oct. 20, 2015

(54) METHOD OF HANDLING SHORTENED RESOURCE BLOCK FOR MACHINE TYPE COMMUNICATION DEVICE AND RELATED COMMUNICATION DEVICE

(71) Applicant: Industrial Technology Research Institute, Hsinchu (TW)

(72) Inventor: Chien-Min Lee, Hsinchu County (TW)

(73) Assignee: Industrial Technology Research Institute, Chutung, Hsinchu (TW)

(*) Notice: Subject to any disclaimer, the term of this patent is extended or adjusted under 35 U.S.C. 154(b) by 71 days.

(21) Appl. No.: 13/670,464

(22) Filed: Nov. 7, 2012

(65) Prior Publication Data

US 2013/0114393 A1    May 9, 2013

Related U.S. Application Data

(60) Provisional application No. 61/556,841, filed on Nov. 8, 2011, provisional application No. 61/566,019, filed on Dec. 2, 2011.

(51) Int. Cl.
*H04L 5/00* (2006.01)
*H04W 72/04* (2009.01)

(52) U.S. Cl.
CPC .............. *H04L 5/0048* (2013.01); *H04L 5/003* (2013.01); *H04L 5/0007* (2013.01); *H04L 5/0005* (2013.01); *H04W 72/042* (2013.01)

(58) Field of Classification Search
USPC ......... 370/210, 203, 329, 310, 328, 330, 485; 455/450, 509
See application file for complete search history.

(56) References Cited

U.S. PATENT DOCUMENTS

| 8,509,323 | B2 * | 8/2013 | Nangia et al. | 375/260 |
| 2007/0217440 | A1 | 9/2007 | Cho | |
| 2008/0049851 | A1 | 2/2008 | Nangia | |
| 2009/0116424 | A1 | 5/2009 | Abeta | |
| 2010/0027492 | A1 * | 2/2010 | Asanuma | 370/329 |
| 2010/0135242 | A1 * | 6/2010 | Nam et al. | 370/330 |
| 2011/0019633 | A1 | 1/2011 | Tajima | |
| 2011/0041027 | A1 * | 2/2011 | Fong et al. | 714/749 |

(Continued)

FOREIGN PATENT DOCUMENTS

| CN | 101507222 A | 8/2009 |
| WO | 2008024577 A1 | 2/2008 |
| WO | 2011097767 A1 | 8/2011 |

OTHER PUBLICATIONS

Jim Zyren, Overview of the 3GPP Long Term Evolution Physical Layer, Rev 0, Jul. 2007, White paper, Document No. 3GPPEVOLUTIONWP.*

(Continued)

*Primary Examiner* — Habte Mered
*Assistant Examiner* — Rownak Islam
(74) *Attorney, Agent, or Firm* — Winston Hsu; Scott Margo

(57) ABSTRACT

A method of arranging a shortened resource block (RB) without a direct current (DC) subcarrier for a wireless communication system comprising a communication device and a network is disclosed. The method comprises selecting a RB from a plurality of RBs comprising a plurality of available subcarriers, according to a configuration, wherein the RB comprises a plurality of subcarriers; and removing the DC subcarrier from the plurality of subcarriers of the RB according to the configuration, to construct the shortened RB without the DC subcarrier.

48 Claims, 13 Drawing Sheets

(56) References Cited

U.S. PATENT DOCUMENTS

| | | |
|---|---|---|
| 2011/0103449 A1* | 5/2011 | Mcnamara .................... 375/224 |
| 2011/0177807 A1 | 7/2011 | Cho |
| 2011/0206000 A1 | 8/2011 | Kwon |
| 2011/0268070 A1* | 11/2011 | Guan et al. .................... 370/329 |
| 2011/0292893 A1 | 12/2011 | Lee |
| 2011/0310854 A1 | 12/2011 | Zou |
| 2011/0317780 A1* | 12/2011 | Kang et al. .................... 375/260 |
| 2012/0230261 A1 | 9/2012 | Pradas |
| 2012/0307632 A1 | 12/2012 | Guo |
| 2013/0039314 A1 | 2/2013 | Prateek |
| 2013/0130684 A1 | 5/2013 | Gomes |
| 2014/0080531 A1 | 3/2014 | Du |

OTHER PUBLICATIONS

3GPP TS 36.321 V8.0.0 (Dec. 2007).
3GPP TS 25.331 V1.1.0 (Jun. 1999).

* cited by examiner

METHOD OF HANDLING SHORTENED RESOURCE BLOCK FOR MACHINE TYPE COMMUNICATION DEVICE AND RELATED COMMUNICATION DEVICE

CROSS REFERENCE TO RELATED APPLICATIONS

This application claims both the benefit of U.S. Provisional Application No. 61/556,841, filed on Nov. 8, 2011, entitled "Method of radio resource assignment for communication devices", and the benefit of U.S. Provisional Application No. 61/566,019, filed on Dec. 2, 2011, entitled "Method of radio resource assignment for communication devices", the contents of which are incorporated herein in their entirety.

BACKGROUND OF THE INVENTION

1. Field of the Invention

The present invention relates to a method used in a wireless communication system and related communication device, and more particularly, to a method of handling a shortened resource block for a machine type communication (MTC) device and related communication device.

2. Description of the Prior Art

A long-term evolution (LTE) system supporting the 3GPP Rel-8 standard and/or the 3GPP Rel-9 standard are developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (COMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

A machine type communication (MTC) device which can automatically perform predefined jobs and report corresponding results to other devices, a server, a NB or an eNB can be used in various areas, such as security, tracking and tracing, payment, healthcare, metering, etc. Further, the MTC device preferably reports the corresponding results via a wireless link such that limitation caused by environment can be removed. However, the wireless link used by the MTC device is needed to be established, and radio resource required by the wireless link is needed to be allocated (i.e., assigned). Reuse of existing infrastructures and wireless communication systems become a viable choose for operation of the MTC device. Therefore, the UMTS, the LTE system and the LTE-A system, etc., developed by the 3GPP which are widely deployed are suitable for the operation of the MTC device.

However, a maximum bandwidth (i.e., access bandwidth) of the MTC device is usually narrower than a legacy UE. Accordingly, locations of direct current (DC) subcarriers for the MTC device and the legacy UE are different, i.e., not aligned. When the MTC device processes resource blocks (RBs), a different method for the MTC device to handle the DC subcarrier is needed. Besides, arrangements of reference signals may be needed to be changed correspondingly, when arrangements of the resource blocks are changed.

SUMMARY OF THE INVENTION

The present invention therefore provides a method and related communication device for handling a shortened resource block for a machine type communication (MTC) device and related communication device to solve the above-mentioned problems.

A method of arranging a shortened resource block (RB) without a direct current (DC) subcarrier for a wireless communication system comprising a communication device and a network is disclosed. The method comprises selecting a RB from a plurality of RBs comprising a plurality of available subcarriers, according to a configuration, wherein the RB comprises a plurality of subcarriers; and removing the DC subcarrier from the plurality of subcarriers of the RB according to the configuration, to construct the shortened RB without the DC subcarrier.

A wireless communication system comprising a communication device and a network, for arranging a shortened resource block (RB) without a direct current (DC) subcarrier is disclosed. The wireless communication system comprises means for selecting a RB from a plurality of RBs comprising a plurality of available subcarriers, according to a configuration, wherein the RB comprises a plurality of subcarriers; and means for removing the DC subcarrier from the plurality of subcarriers of the RB according to the configuration, to construct the shortened RB without the DC subcarrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
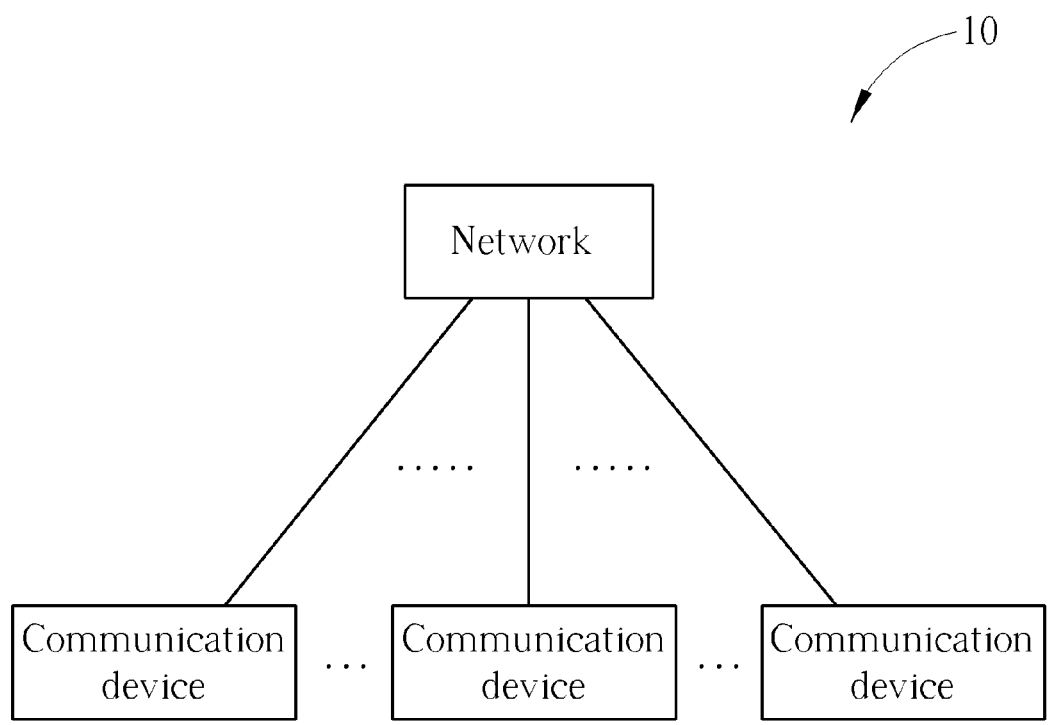
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network can be a universal terrestrial radio access network (UTRAN) comprising a plurality of Node-Bs (NBs) in a universal mobile telecommunications system (UMTS). Alternatively, the network can be an evolved UTRAN (E-UTRAN) comprising a plurality of evolved NBs (eNBs) and/or relays in a long term evolution (LTE) system or a LTE-Advanced (LTE-A) system.

Furthermore, the network can also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. Besides, the information can be processed by both the UTRAN/E-UTRAN and the core network, and the decisions are made after coordination and/or cooperation are performed by the UTRAN/E-UTRAN and the core network.

The communication devices can be machine-type communication (MTC) devices for performing MTC with the network. Alternatively, the communication devices can be mobile phones, laptops, tablet computers, electronic books, and portable computer systems wherein a MTC function is enabled for performing the MTC with the network. The communication devices can also be referred to mobile stations (MSs) or user equipments (UEs) with the MTC function in the UMTS, the LTE system or the LTE-A system, for performing the MTC with the network. Besides, the network and a communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
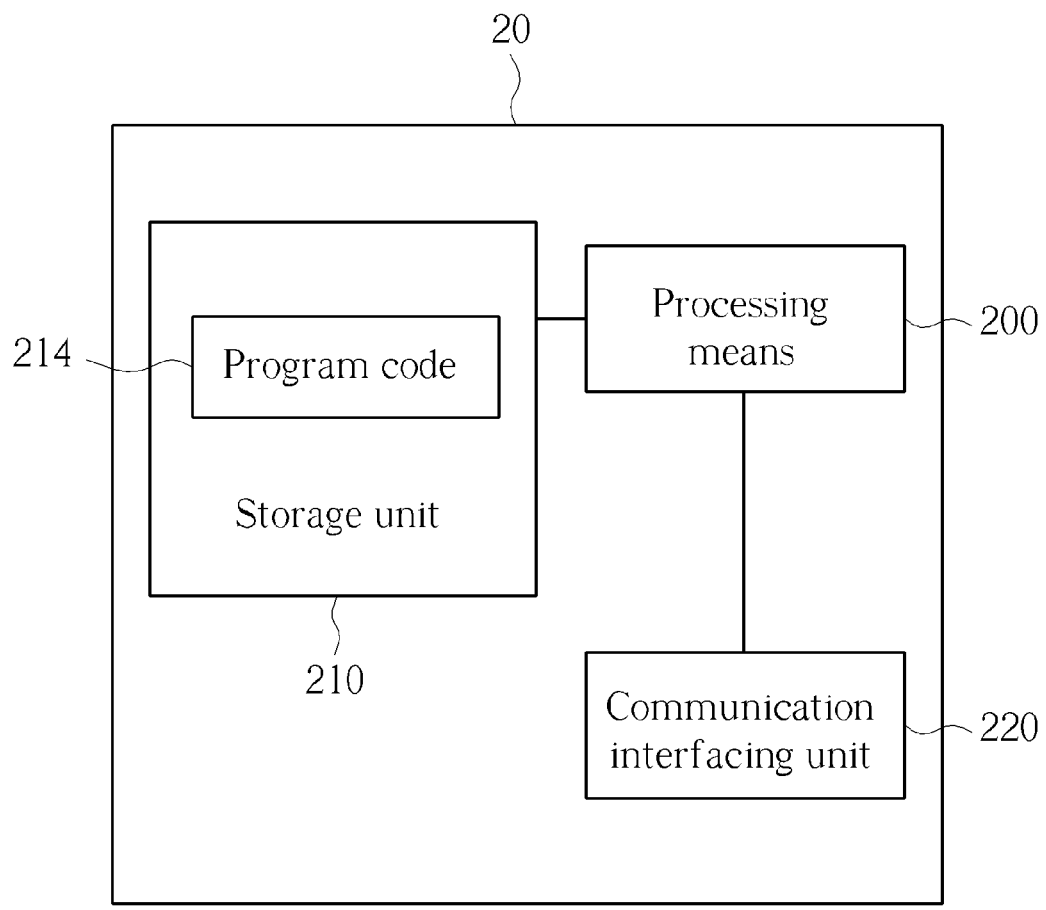
FIG. 2 is a schematic diagram of a communication device according to an example of the present invention.

Please refer to FIG. 2, which is a schematic diagram of a communication device 20 according to an example of the present invention. The communication device 20 can be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., messages or packets) according to processing results of the processing means 200.

Figure 3:
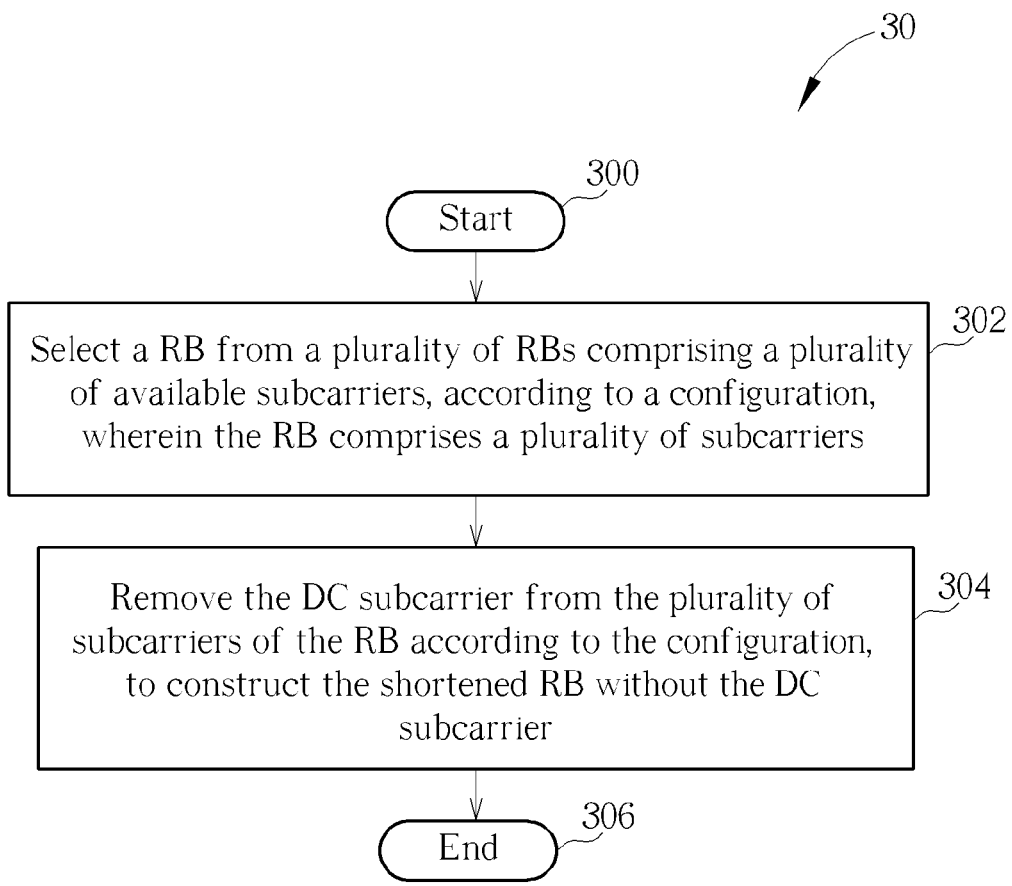
FIG. 3 is a flowchart of a process according to an example of the present invention.

Please refer to FIG. 3, which is a flowchart of a process 30 according to an example of the present invention. The process 30 is utilized in the wireless communication system 10 shown in FIG. 1, for arranging a shortened resource block (RB) without a direct current (DC) subcarrier. The process 30 can be utilized in the network and/or the communication device. The process 30 may be compiled into the program code 214 and includes the following steps:

Step 300: Start.

Step 302: Select a RB from a plurality of RBs comprising a plurality of available subcarriers, according to a configuration, wherein the RB comprises a plurality of subcarriers.

Step 304: Remove the DC subcarrier from the plurality of subcarriers of the RB according to the configuration, to construct the shortened RB without the DC subcarrier.

Step 306: End.

According to the process 30, after a RB is selected from a plurality of RBs comprising a plurality of available subcarriers, according to a configuration, wherein the RB comprises a plurality of subcarriers, the network and/or the communication device can remove the DC subcarrier from the plurality of subcarriers of the RB according to the configuration, to construct the shortened RB without the DC subcarrier from the RB. For example, the configuration can be determined according to at least one of a carrier frequency of the communication device and a maximum bandwidth (i.e., access bandwidth) supported by the communication device. In general, the maximum bandwidth is only a fraction of a maximum bandwidth supported by a legacy UE. Besides, the configuration can be determined by the network, and is then transmitted to the communication device via a higher layer signaling. Thus, problem of removing the DC subcarrier can be solved.

Figure 4:
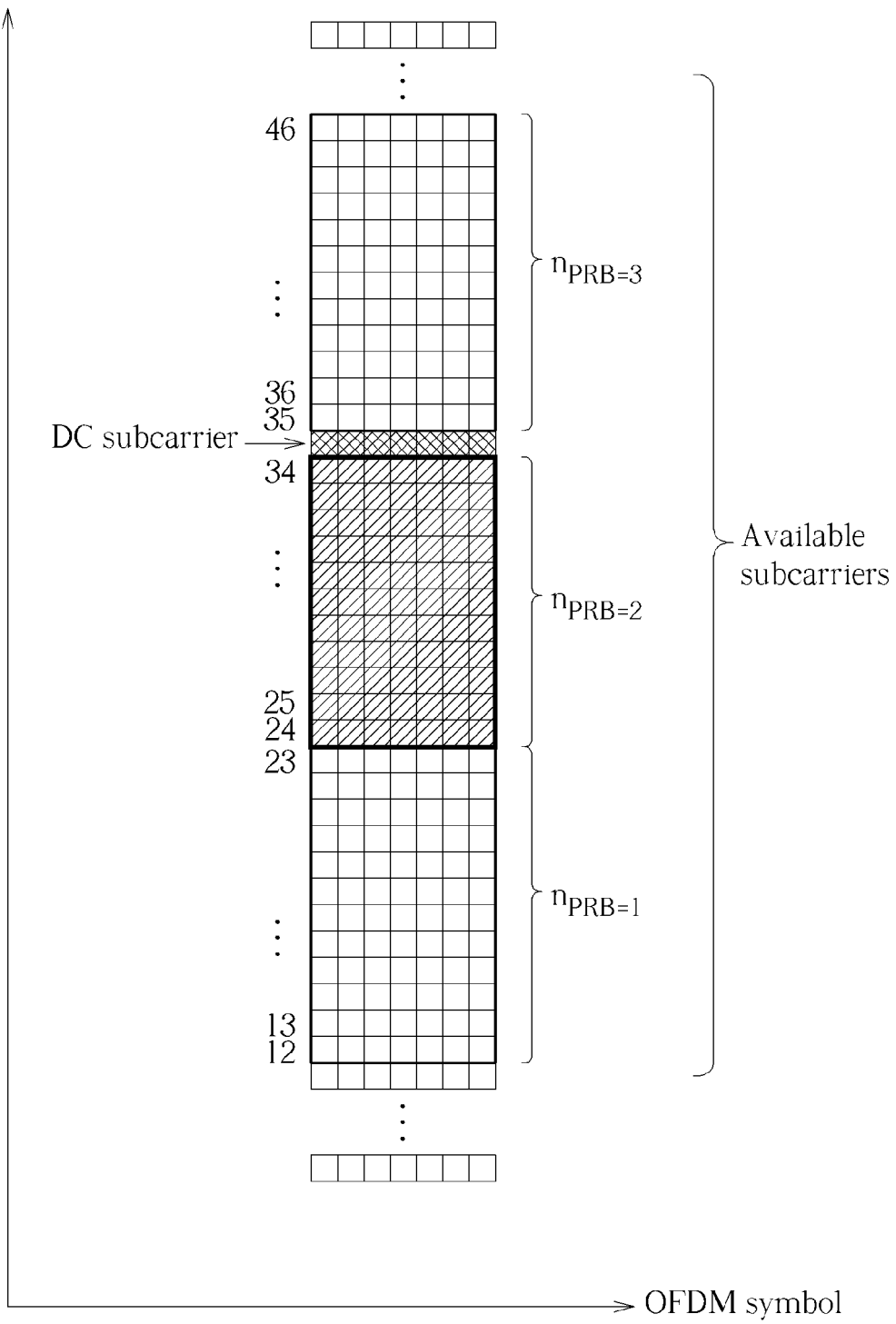
FIG. 4 is a schematic diagram of RBs according to an example of the present invention.

For example, the configuration can comprise determining the last subcarrier of the RB as the DC subcarrier, when a maximum bandwidth supported by the communication device is 1.4 MHz, 10 MHz or 20 MHz, wherein the bandwidths of 1.4 MHz, 10 MHz and 20 MHz correspond to orthogonal frequency-division multiplexing (OFDM) symbols with fast Fourier transform (FFT) sizes of 128, 1024 and 2048, respectively. Preferably, an index of the RB (i.e., the shortened RB) is determined according to the following equation:

$$k' = \left\{ k_{DC} - \frac{N_{RB}^{DL} \times N_{SC}^{RB}}{2} + 1, \ldots, \right. \tag{Eq.1}$$

$$\left. k_{DC} - 1, k_{DC} + 1, \ldots, k_{DC} + \frac{N_{RB}^{DL} \times N_{SC}^{RB}}{2} \right\},$$

$$k = \text{reorder}(k'),$$

$$n_{PRB} = \begin{cases} \left\lfloor \frac{k}{N_{SC}^{RB}} \right\rfloor, & k < \frac{N_{RB}^{DL} \times N_{SC}^{RB}}{2} - 1 \\ \left\lfloor \frac{k+1}{N_{SC}^{RB}} \right\rfloor, & \text{else} \end{cases}, \text{ and}$$

$$n_{PRB-Shortened} = \frac{N_{RB}^{DL}}{2} - 1;$$

wherein k' are indices of the plurality of available subcarriers (i.e., to be processed by the communication device and/or the network), $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB\text{-}Shortened}$ is an index of the shortened RB. Please refer to FIG. 4, which is a schematic diagram of RBs according to an example of the present invention. FIG. 4 is used for illustrating the equation, and is explained as follows. When the maximum bandwidth supported by the communication device is 1.4 MHz, FFT size of an OFDM symbol is 128, and subcarrier indices (of available subcarriers) are {0, 1, ..., 127}, $N_{RB}^{DL}$=6, $N_{SC}^{RB}$=12 and $k_{DC}$=64. According to Eq.1, k'={29, 30, ..., 63, 65, ... 99, 100} and k={0, 1, ..., 69, 70}. Further, $n_{PRB}$ and $n_{PRB\text{-}shortened}$ can be obtained as follows:

$$n_{PRB} = \begin{cases} 0, & 0 \leq k \leq 11 \\ 1, & 12 \leq k \leq 23 \\ 2, & 24 \leq k \leq 34 \\ 3, & 35 \leq k \leq 46 \\ 4, & 47 \leq k \leq 58 \\ 5, & 59 \leq k \leq 70 \end{cases}, \text{ and} \quad (\text{Eq.2})$$

$$n_{PRB\text{-}Shortened} = 2.$$

That is, the third RB ($n_{PRB\text{-}Shortened}$=2) is determined as the shortened RB, and the last subcarrier of the third RB is determined as the DC subcarrier and is removed.

Figure 5:
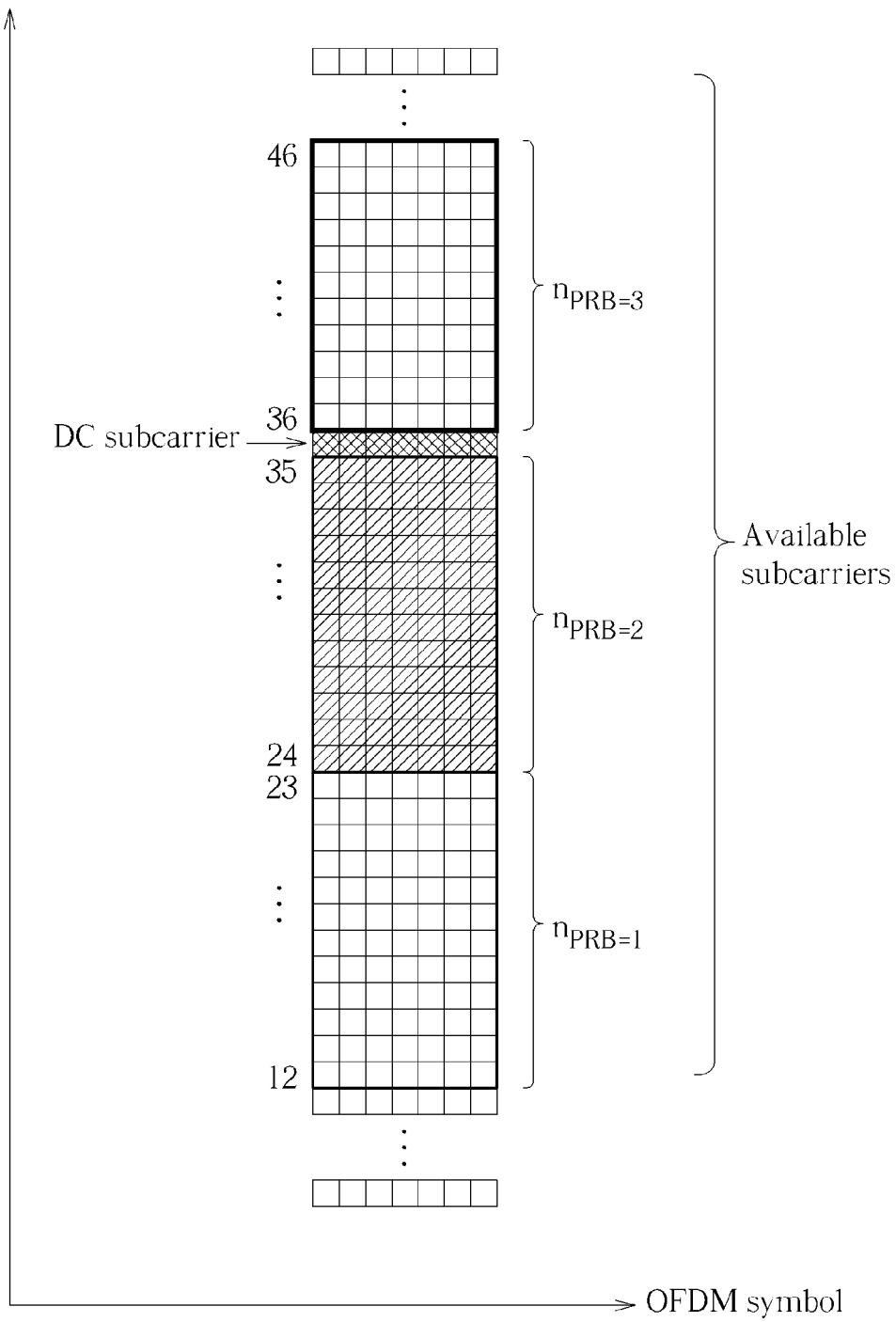
FIG. 5 is a schematic diagram of RBs according to an example of the present invention.

On the other hand, the configuration can comprise determining the first subcarrier of the RB as the DC subcarrier, when a maximum bandwidth supported by the communication device is 1.4 MHz, 10 MHz or 20 MHz, wherein the bandwidths of 1.4 MHz, 10 MHz and 20 MHz correspond to OFDM symbols with FFT sizes of 128, 1024 and 2048, respectively. Preferably, an index of the RB (i.e., the shortened RB) is determined according to the following equation:

$$k' = \left\{ k_{DC} - \frac{N_{RB}^{DL} \times N_{SC}^{RB}}{2}, \ldots, k_{DC} - 1, \right. \quad (\text{Eq.3})$$

$$\left. k_{DC} + 1, \ldots, k_{DC} + \frac{N_{RB}^{DL} \times N_{SC}^{RB}}{2} - 1 \right\},$$

$$k = \text{reorder}(k'),$$

$$n_{PRB} = \begin{cases} \left\lfloor \frac{k}{N_{SC}^{RB}} \right\rfloor, & k < \frac{N_{RB}^{DL} \times N_{SC}^{RB}}{2} \\ \frac{N_{RB}^{DL}}{2} + \left\lfloor \frac{k_-}{N_{SC}^{RB}} \right\rfloor, & \text{else} \end{cases},$$

$$\text{wherein } k_- = k - \frac{N_{RB}^{DL} \times N_{SC}^{RB}}{2} - 1,$$

$$\text{and } n_{PRB\text{-}Shortened} = \frac{N_{RB}^{DL}}{2};$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB\text{-}Shortened}$ is an index of the shortened RB. Please refer to FIG. 5, which is a schematic diagram of RBs according to an example of the present invention. FIG. 5 is used for illustrating the equation, and is explained as follows. When the maximum bandwidth supported by the communication device is 1.4 MHz, FFT size of an OFDM symbol is 128, and subcarrier indices (of available subcarriers) are {0, 1, ..., 127}, $N_{RB}^{DL}$=6, $N_{SC}^{RB}$7=12 and $k_{DC}$=64. According to Eq.3, k'={28, 29, ..., 63, 65, ..., 98, 99} and k={0, 1, ..., 69, 70}. Further, $n_{PRB}$ and $n_{PRB\text{-}Shortened}$ can be obtained as follows:

$$n_{PRB} = \begin{cases} 0, & 0 \leq k \leq 11 \\ 1, & 12 \leq k \leq 23 \\ 2, & 24 \leq k \leq 35 \\ 3, & 36 \leq k \leq 46 \\ 4, & 47 \leq k \leq 58 \\ 5, & 59 \leq k \leq 70 \end{cases}, \text{ and} \quad (\text{Eq.4})$$

$$n_{PRB\text{-}Shortened} = 3.$$

That is, the fourth RB ($n_{PRB\text{-}Shortened}$=3) is determined as the shortened RB, and the first subcarrier of the fourth RB is determined as the DC subcarrier and is removed.

Figure 6:
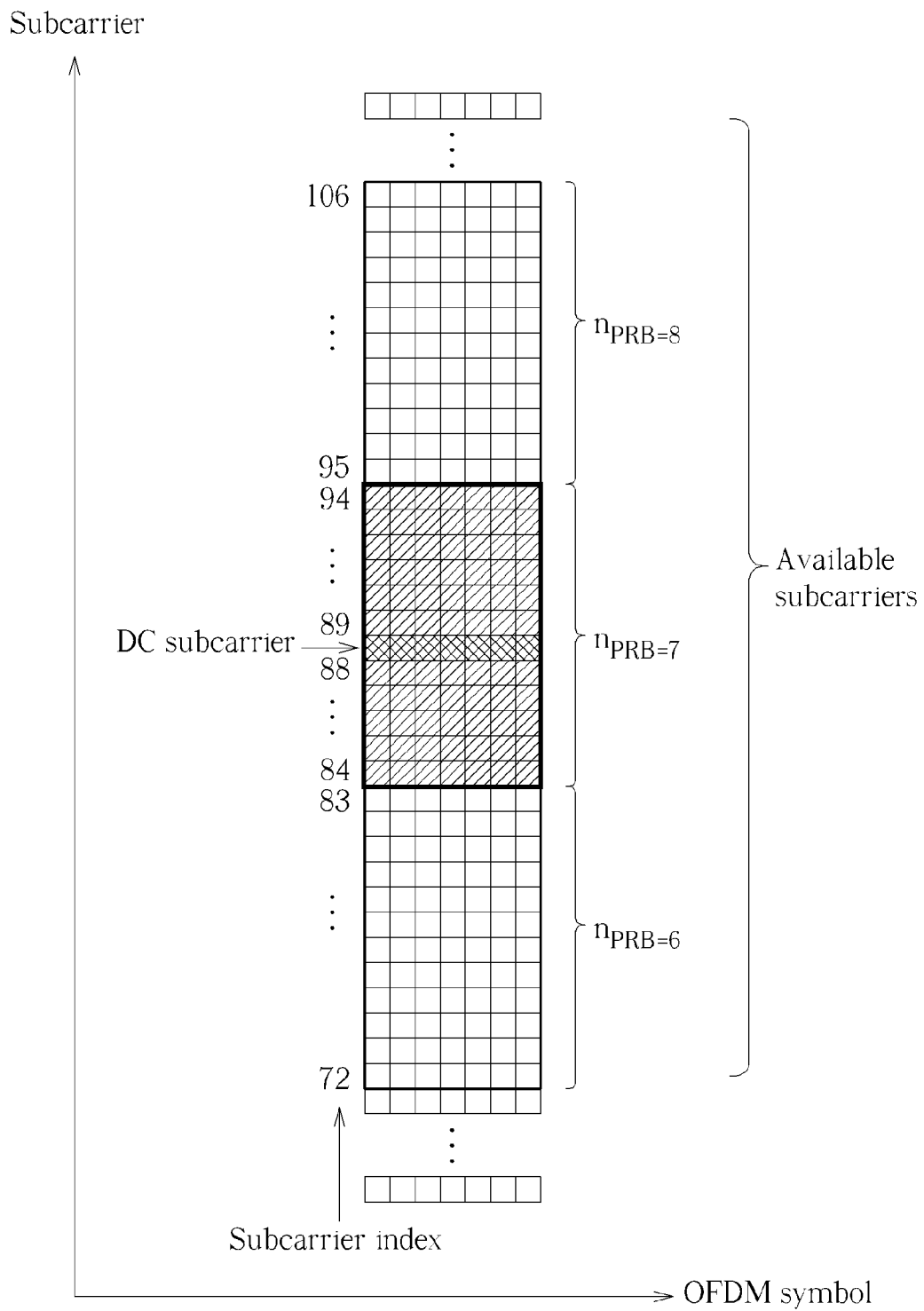
FIG. 6 is a schematic diagram of RBs according to an example of the present invention.

Furthermore, the configuration comprises determining a middle subcarrier of the RB as the DC subcarrier, when a maximum bandwidth supported by the communication device is 3 MHz, 5 MHz or 15 MHz, wherein the bandwidths of 3 MHz, 5 MHz and 15 MHz correspond to OFDM symbols with FFT sizes of 256, 512 and 1536, respectively. Preferably, an index of the RB (i.e., the shortened RB) is determined according to the following equation:

$$k' = \left\{ k_{DC} - \frac{N_{RB}^{DL} \times N_{SC}^{RB}}{2} + 1, \ldots, \right. \quad (\text{Eq.5})$$

$$\left. k_{DC} - 1, k_{DC} + 1, \ldots, k_{DC} + \frac{N_{RB}^{DL} \times N_{SC}^{RB}}{2} \right\},$$

$$k = \text{reorder}(k'),$$

$$n_{PRB} = \begin{cases} \left\lfloor \frac{k}{N_{SC}^{RB}} \right\rfloor, & k < \frac{N_{RB}^{DL} \times N_{SC}^{RB}}{2} - 1 \\ \left\lfloor \frac{k+1}{N_{SC}^{RB}} \right\rfloor, & \text{else} \end{cases}, \text{ and}$$

$$n_{PRB\text{-}Shortened} = \left\lfloor \frac{N_{RB}^{DL}}{2} \right\rfloor;$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB\text{-}Shortened}$ is an index of the shortened RB. Please refer to FIG. 6, which is a schematic diagram of RBs according to an example of the present invention. FIG. 6 is used for illustrating the equation, and is explained as follows. When the maximum bandwidth supported by the communication device is 3 MHz, FFT size of an OFDM symbol is 256, and subcarrier indices (of available subcarriers) are {0, 1, ..., 255}, $N_{RB}^{DL}$=15, $N_{SC}^{RB}$=12 and $k_{DC}$=128. According to the above equation, k'={39, 40, ..., 127, 129, ..., 217, 218} and k={0, 1, ..., 177, 178}. Further, $n_{PRB}$ and $n_{PRB\text{-}Shortened}$ can be obtained as follows:

$$n_{PRB} = \begin{cases} 0, & 0 \le k \le 11 \\ 1, & 12 \le k \le 23 \\ \vdots & \vdots \\ 7, & 84 \le k \le 88 \\ 7, & 89 \le k \le 94 \\ 8, & 95 \le k \le 106 \\ \vdots & \vdots \\ 14, & 167 \le k \le 178 \end{cases}, \text{ and} \qquad (\text{Eq.6})$$

$$n_{PRB-Shortened} = 7.$$

That is, the eighth RB ($n_{PRB-Shortened}=7$) is determined as the shortened RB, and the middle subcarrier of the eighth RB is determined as the DC subcarrier and is removed. Alternatively, k' in Eq.5 can be represented as follows $$k' = \left\{ k_{DC} - \frac{N_{RB}^{DL} \times N_{SC}^{RB}}{2}, \ldots, \right. \qquad (\text{Eq.7})$$

$$\left. k_{DC} - 1, k_{DC} + 1, \ldots, k_{DC} + \frac{N_{RB}^{DL} \times N_{SC}^{RB}}{2} - 1 \right\}.$$

Accordingly, the same $n_{PRB}$ and $n_{PRB-Shortened}$ as those shown in Eq.7 can be obtained. Detail can be referred to the above description, and is not narrated herein.

On the other hand, locations of reference signals in a RB should be improved, after the RB is shortened as the shortened RB. For example, a first plurality of reference signals can be arranged at the first subcarrier, the sixth subcarrier and the eleventh subcarrier in the shortened RB of each of the third OFDM symbol, the fourth OFDM symbol, the sixth OFDM symbol and the seventh OFDM symbol in at least one even-numbered slot for a first antenna port, when a normal cyclic prefix (CP) is used in each OFDM symbol in the at least one even-numbered slot. When a second antenna port is also used, second plurality of reference signals can be arranged at the first subcarrier, the sixth subcarrier and the eleventh subcarrier in the shortened RB of each of the third OFDM symbol, the fourth OFDM symbol, the sixth OFDM symbol and the seven OFDM symbol in the at least one even-numbered slot for the second antenna port, when the normal CP is used in each OFDM symbol in the at least one even-numbered slot.

Figure 7:
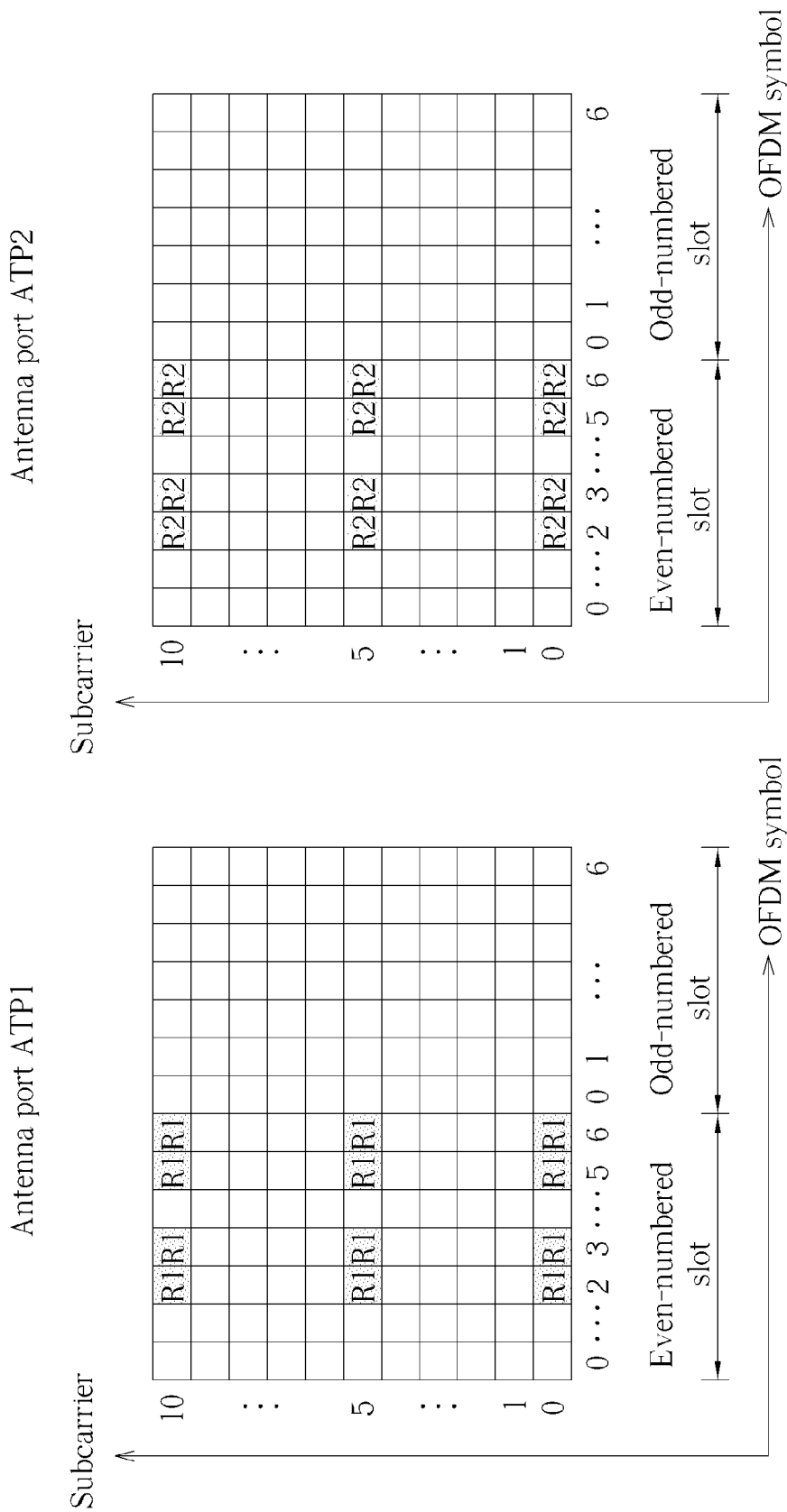
FIG. 7 is a schematic diagram of the shortened RB according to an example of the present invention.

In detail, please refer to FIG. 7, which is a schematic diagram of the shortened RB according to an example of the present invention. Reference signals R1 and R2 are transmitted via antenna ports ATP1 and ATP2, respectively, are shown in FIG. 7. Further, the reference signals R1 and R2 can be allocated in at least one even-numbered slot, and is not limited. Only one even-numbered slot is shown in FIG. 7 for simplicity. Besides, a reference signal arranged at a subcarrier 0 of an OFDM symbol 1 (i.e., the first subcarrier of the shortened RB of the second OFDM symbol) is said to be arranged at (1,0), to simplify the description. The simplification of the notation is used in the following examples as well. As shown in FIG. 7, the reference signals R1 are arranged at (2,0), (2,5), (2,10), (3,0), (3,5), (3,10), (5,0), (5,5), (5,10), (6,0), (6,5) and (6,10) of the even-number slot, and the reference signals R2 are arranged at (2,0), (2,5), (2,10), (3,0), (3,5), (3,10), (5,0), (5,5), (5,10), (6,0), (6,5) and (6,10) of the even-number slot. When the reference signals R1 and R2 are transmitted at the same time, the reference signals R1 and R2 are preferably multiplexed by using a code-division multiplexing (CDM). Preferably, the above example is applied to special subframe configurations 1, 2, 6 and/or 7 specified in the 3GPP standard.

Alternatively, a first plurality of reference signals can be arranged at the first subcarrier, the sixth subcarrier and the eleventh subcarrier in the shortened RB of each of the third OFDM symbols and the fourth OFDM symbols in at least one even-numbered slot and at least one odd-numbered slot for a first antenna port, when a normal CP is used in each OFDM symbol in both the at least one even-numbered slot and the at least one odd-numbered slot. When a second antenna port is also used, a second plurality of reference signals can be arranged at the first subcarrier, the sixth subcarrier and the eleventh subcarrier in the shortened RB of each of the third OFDM symbols and the fourth OFDM symbols in the at least one even-numbered slot and the at least one odd-numbered slot for the second antenna port, when the normal CP is used in each OFDM symbol in both the at least one even-numbered slot and the at least one odd-numbered slot.

Figure 8:
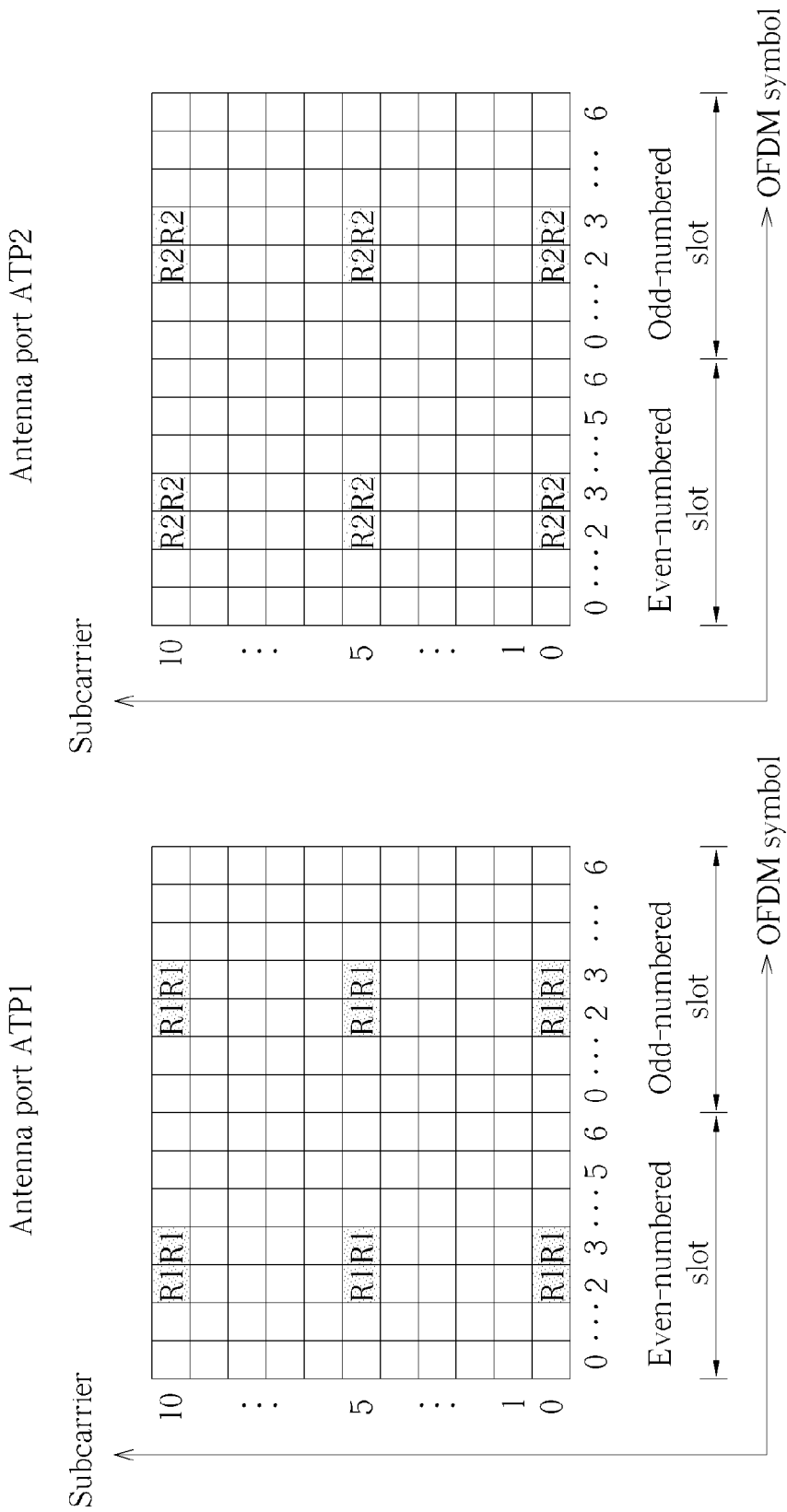
FIG. 8 is a schematic diagram of the shortened RB according to an example of the present invention.

In detail, please refer to FIG. 8, which is a schematic diagram of the shortened RB according to an example of the present invention. Reference signals R1 and R2 are transmitted via antenna ports ATP1 and ATP2, respectively, are shown in FIG. 8. Further, the reference signals R1 and R2 can be allocated in at least one even-numbered slot and at least one odd-numbered slot, and is not limited. Only one even-numbered slot and one odd-numbered slot are shown in FIG. 8 for simplicity. As shown in FIG. 8, the reference signals R1 are arranged at (2,0), (2,5), (2,10), (3,0), (3,5) and (3,10) of the even-number slot and the odd-number slot, and the reference signals R2 are arranged at (2,0), (2,5), (2,10), (3,0), (3,5) and (3,10) of the even-number slot and the odd-number slot. When the reference signals R1 and R2 are transmitted at the same time, the reference signals R1 and R2 are preferably multiplexed by using the CDM. Preferably, the above example can be applied to special subframe configurations 3, 4 and/or 8 specified in the 3GPP standard.

In another example, a first plurality of reference signals can be arranged at the first subcarrier, the sixth subcarrier and the eleventh subcarrier in the shortened RB of each of the sixth OFDM symbols and the seventh OFDM symbols in at least one even-numbered slot and at least one odd-numbered slot for a first antenna port, when a normal CP is used in each OFDM symbol in both the at least one even-numbered slot and the at least one odd-numbered slot. When a second antenna port is used, a second plurality of reference signals can be arranged at the first subcarrier, the sixth subcarrier and the eleventh subcarrier in the shortened RB of each of the sixth OFDM symbols and the seventh OFDM symbols in the at least one even-numbered slot and the at least one odd-numbered slot for the second antenna port, when the normal CP is used in each OFDM symbol in both the at least one even-numbered slot and the at least one odd-numbered slot.

Figure 9:
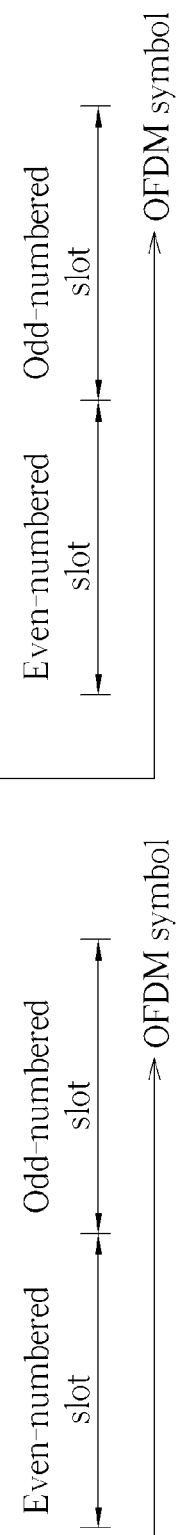
FIG. 9 is a schematic diagram of the shortened RB according to an example of the present invention.

In detail, please refer to FIG. 9, which is a schematic diagram of the shortened RB according to an example of the present invention. Reference signals R1 and R2 are transmitted via antenna ports ATP1 and ATP2, respectively, are shown in FIG. 9. Further, the reference signals R1 and R2 can be allocated in at least one even-numbered slot and at least one odd-numbered slot, and is not limited. Only one even-numbered slot and one odd-numbered slot are shown in FIG. 9 for simplicity. As shown in FIG. 9, the reference signals R1 are arranged at (5,0), (5,5), (5,10), (6,0), (6,5) and (6,10) of the even-number slot and the odd-number slot, and the reference signals R2 are arranged at (5,0), (5,5), (5,10), (6,0), (6,5) and (6,10) of the even-number slot and the odd-number slot. When the reference signals R1 and R2 are transmitted at the same time, the reference signals R1 and R2 are preferably multiplexed by using the CDM. Preferably, the above example can be applied to all other DL subframe configurations specified in the 3GPP standard.

The above examples are used for illustrating situations where the normal CP is used. When an extended CP is used, the reference signals can be arranged in different ways.

For example, a first plurality of reference signals can be arranged at the second subcarrier, the fifth subcarrier, the eighth subcarrier and the eleventh subcarrier in the shortened RB of each of the fifth OFDM symbol and the sixth OFDM symbol in at least one even-numbered slot for a first antenna port, when an extended CP is used in each OFDM symbol in the at least one even-numbered slot. When a second antenna port is used, a second plurality of reference signals are arranged at the second subcarrier, the fifth subcarrier, the eighth subcarrier and the eleventh subcarrier in the shortened RB of each of the fifth OFDM symbol and the sixth OFDM symbol in the at least one even-numbered slot for the second antenna port, when the extended CP is used in each OFDM symbol in the at least one even-numbered slot.

Figure 10:
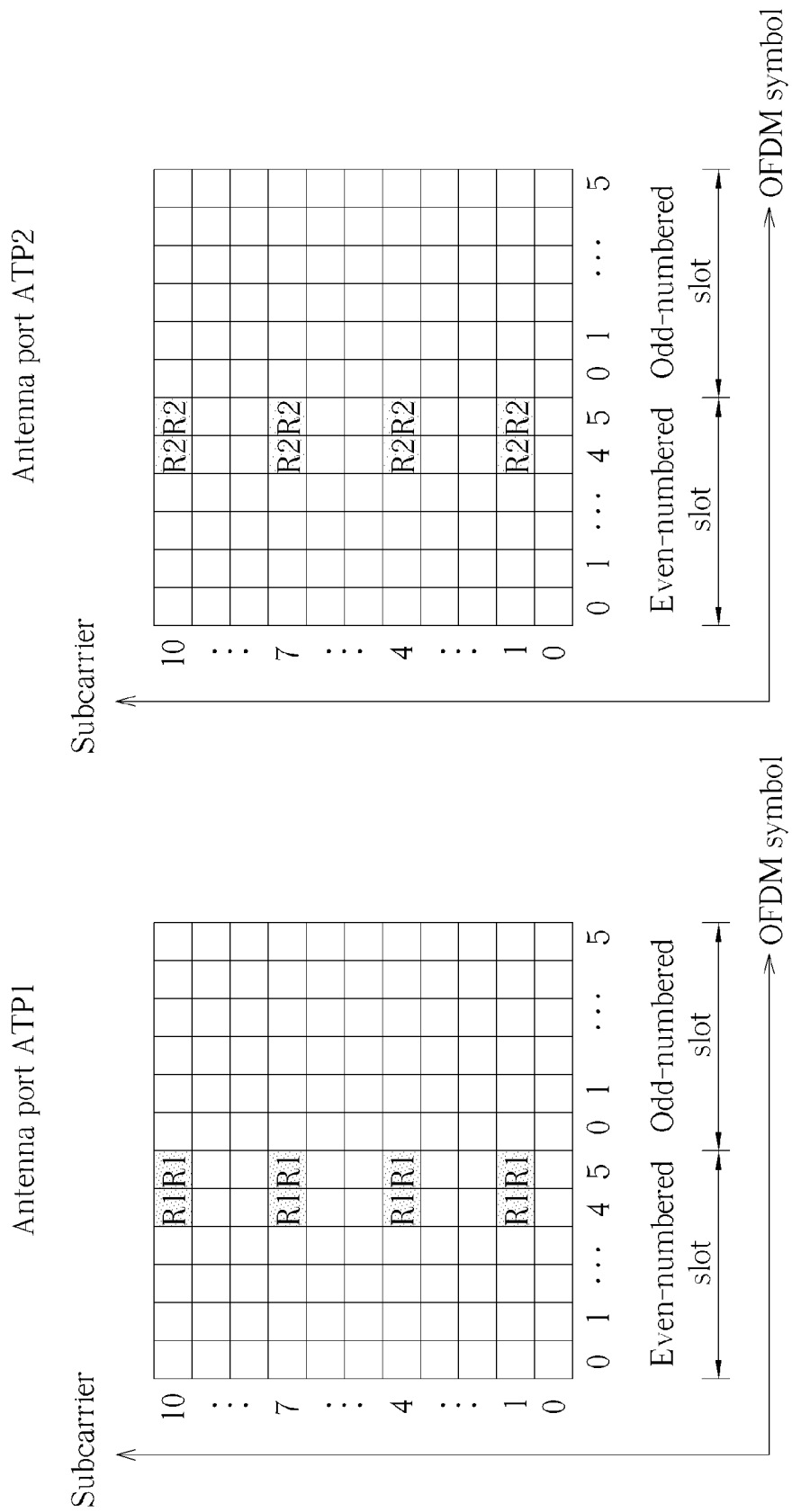
FIG. 10 is a schematic diagram of the shortened RB according to an example of the present invention.

In detail, please refer to FIG. 10, which is a schematic diagram of the shortened RB according to an example of the present invention. Reference signals R1 and R2 are transmitted via antenna ports ATP1 and ATP2, respectively, are shown in FIG. 10. Further, the reference signals R1 and R2 can be allocated in at least one even-numbered slot, and is not limited. Only one even-numbered slot is shown in FIG. 10 for simplicity. As shown in FIG. 10, the reference signals R1 are arranged at (4,1), (4,4), (4,7), (4,10), (5,1), (5,4), (5,7) and (5,10) of the even-number slot, and the reference signals R2 are arranged at (4,1), (4,4), (4,7), (4,10), (5,1), (5,4), (5,7) and (5,10) of the even-number slot. When the reference signals R1 and R2 are transmitted at the same time, the reference signals R1 and R2 are preferably multiplexed by using the CDM. Preferably, the above example can be applied to special subframe configurations 1, 2, 3, 5 and/or 6 specified in the 3GPP standard.

Alternatively, a first plurality of reference signals are arranged at the first subcarrier, the fourth subcarrier, the seventh subcarrier and the tenth subcarrier in the shortened RB of each of the fifth OFDM symbol and the sixth OFDM symbol in at least one even-numbered slot for a first antenna port, when an extended CP is used in each OFDM symbol in the at least one even-numbered slot. When a second antenna port is used, a second plurality of reference signals are arranged at the first subcarrier, the fourth subcarrier, the seventh subcarrier and the tenth subcarrier in the shortened RB of each of the fifth OFDM symbol and the sixth OFDM symbol in the at least one even-numbered slot for the second antenna port, when the extended CP is used in each OFDM symbol in the at least one even-numbered slot.

Figure 11:
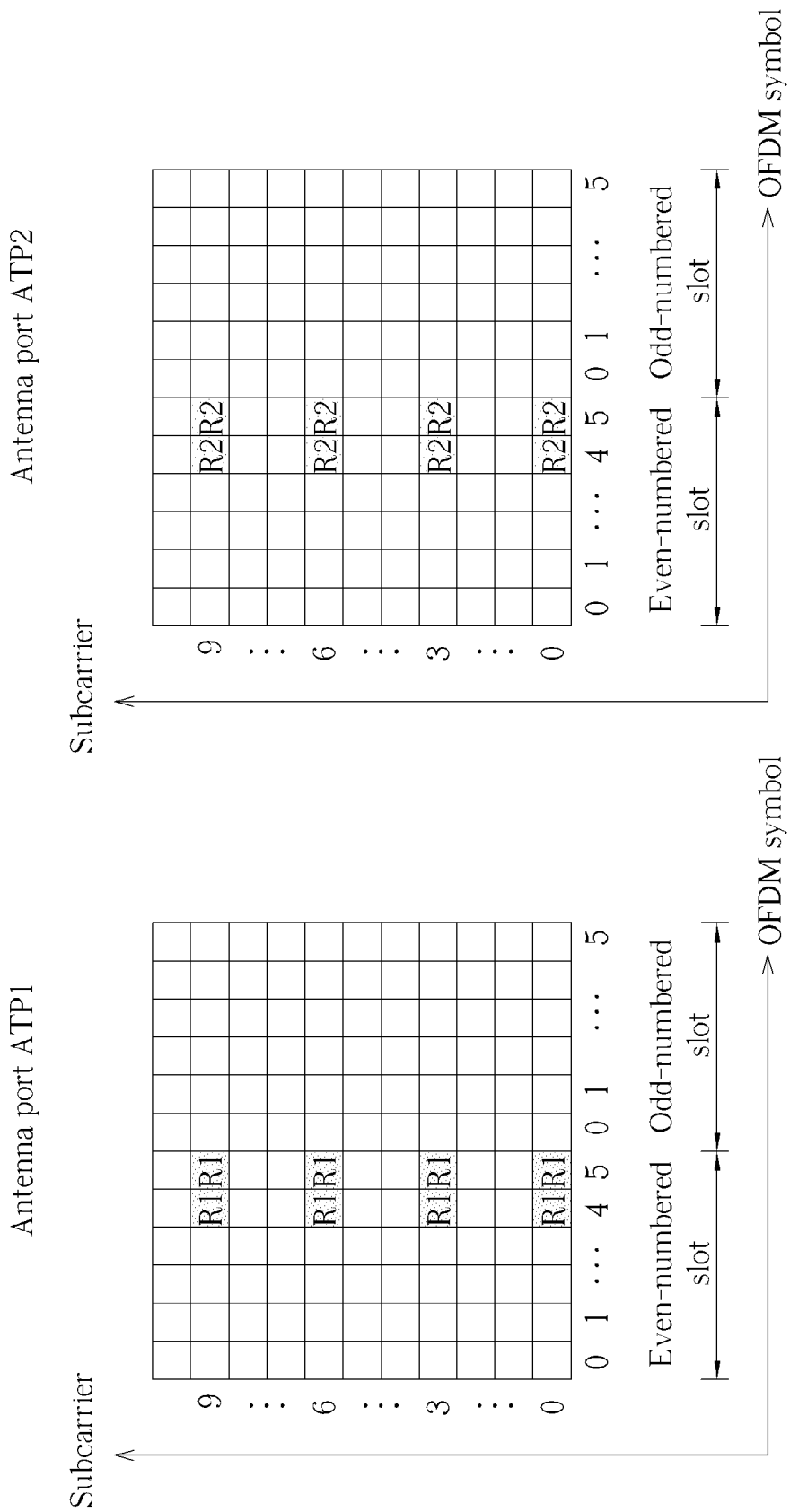
FIG. 11 is a schematic diagram of the shortened RB according to an example of the present invention.

In detail, please refer to FIG. 11, which is a schematic diagram of the shortened RB according to an example of the present invention. Reference signals R1 and R2 are transmitted via antenna ports ATP1 and ATP2, respectively, are shown in FIG. 11. Further, the reference signals R1 and R2 can be allocated in at least one even-numbered slot, and is not limited. Only one even-numbered slot is shown in FIG. 11 for simplicity. As shown in FIG. 11, the reference signals R1 are arranged at (4,0), (4,3), (4,6), (4,9), (5,0), (5,3), (5,6) and (5,9) of the even-number slot, and the reference signals R2 are arranged at (4,0), (4,3), (4,6), (4, 6), (4,9), (5,0), (5,3), (5,6) and (5,9) of the even-number slot. When the reference signals R1 and R2 are transmitted at the same time, the reference signals R1 and R2 are preferably multiplexed by using the CDM. Preferably, the above example can also be applied to special subframe configurations 1, 2, 3, 5 and/or 6 specified in the 3GPP standard.

In another example, a first plurality of reference signals are arranged at the first subcarrier, the fourth subcarrier, the seventh subcarrier and the tenth subcarrier in the shortened RB of each of the fifth OFDM symbol and the sixth OFDM symbol in at least one even-numbered slot and are arranged at the second subcarrier, the fifth subcarrier, the eighth subcarrier and the eleventh subcarrier in the shortened RB of each of the fifth OFDM symbol and the sixth OFDM symbol in at least one odd-numbered slot, for a first antenna port, when an extended CP is used in each OFDM symbol in both the at least one even-numbered slot and the at least one odd-numbered slot. When a second antenna port is used, a second plurality of reference signals are arranged at the first subcarrier, the fourth subcarrier, the seventh subcarrier and the tenth subcarrier in the shortened RB of each of the fifth OFDM symbol and the sixth OFDM symbol in the at least one even-numbered slot and are arranged at the second subcarrier, the fifth subcarrier, the eighth subcarrier and the eleventh subcarrier in the shortened RB of each of the fifth OFDM symbol and the sixth OFDM symbol in the at least one odd-numbered slot, for the second antenna port, when the extended CP is used in each OFDM symbol in both the at least one even-numbered slot and the at least one odd-numbered slot.

Figure 12:
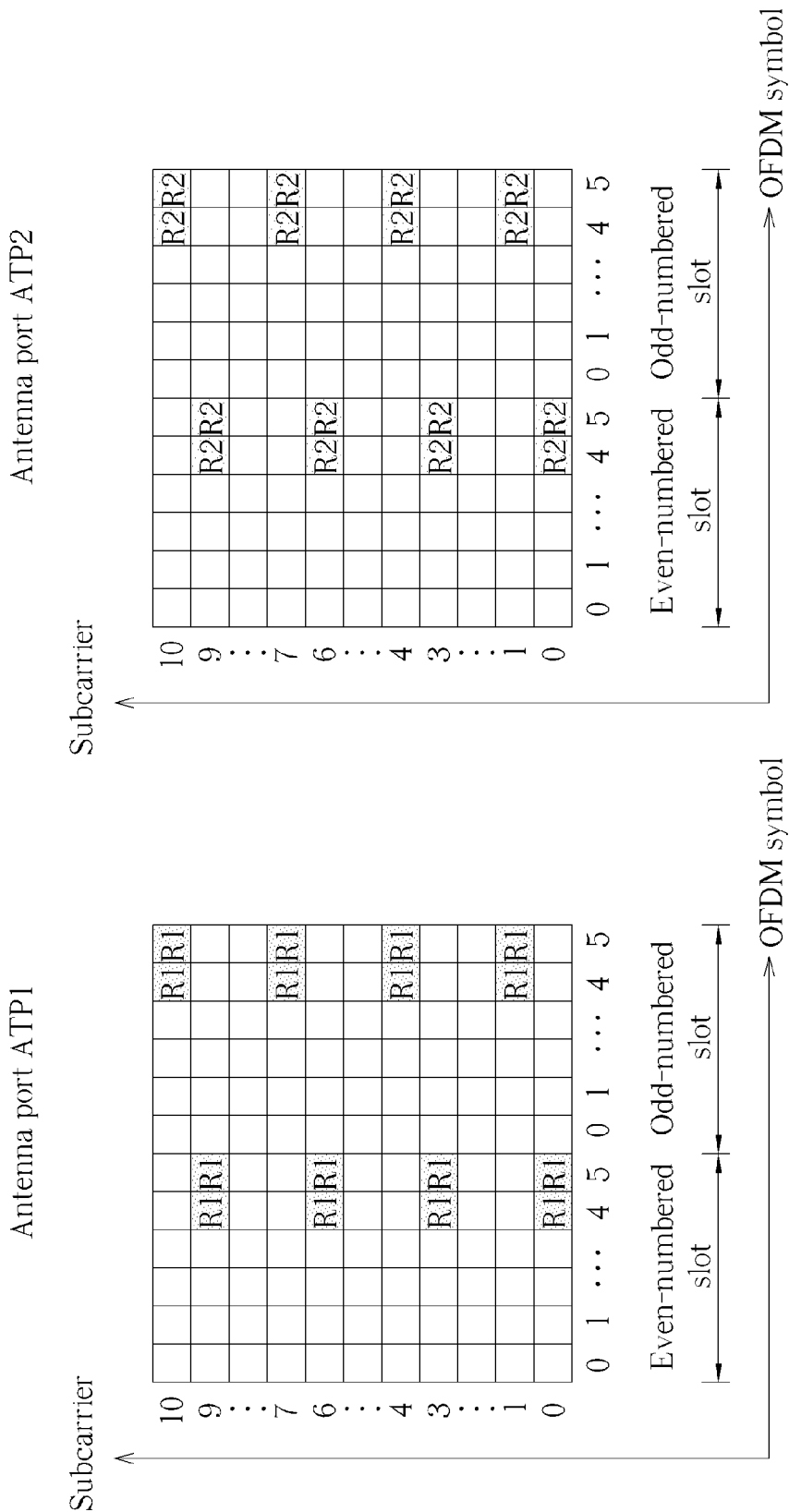
FIG. 12 is a schematic diagram of the shortened RB according to an example of the present invention.

In detail, please refer to FIG. 12, which is a schematic diagram of the shortened RB according to an example of the present invention. Reference signals R1 and R2 are transmitted via antenna ports ATP1 and ATP2, respectively, are shown in FIG. 12. Further, the reference signals R1 and R2 can be allocated in at least one even-numbered slot and at least one odd-numbered slot, and is not limited. Only one even-numbered slot and one odd-numbered slot are shown in FIG. 12 for simplicity. As shown in FIG. 12, the reference signals R1 are arranged at (4,0), (4,3), (4,6), (4,9), (5,0), (5,3), (5,6) and (5,9) of the even-number slot and (4,1), (4,4), (4,7), (4,10), (5,1), (5,4), (5,7) and (5,10) of the odd-number slot. The reference signals R2 are arranged at (4,0), (4,3), (4,6), (4,9), (5,0), (5,3), (5,6) and (5,9) of the even-number slot and (4,1), (4,4), (4,7), (4,10), (5,1), (5,4), (5,7) and (5,10) of the odd-number slot. When the reference signals R1 and R2 are transmitted at the same time, the reference signals R1 and R2 are preferably multiplexed by using the CDM. Preferably, the above example can be applied to all other DL subframe configurations specified in the 3GPP standard.

In another example, a first plurality of reference signals are arranged at the second subcarrier, the fifth subcarrier, the eighth subcarrier and the eleventh subcarrier in the shortened RB of each of the fifth OFDM symbol and the sixth OFDM symbol in at least one even-numbered slot and are arranged at the first subcarrier, the fourth subcarrier, the seventh subcarrier and the tenth subcarrier in the shortened RB of each of the fifth OFDM symbol and the sixth OFDM symbol in at least one odd-numbered slot, for a first antenna port, when an extended CP is used in each OFDM symbol in both the at least one even-numbered slot and the at least one odd-numbered slot. When a second antenna port is used, a second plurality of reference signals are arranged at the second subcarrier, the fifth subcarrier, the eighth subcarrier and the eleventh subcarrier in the shortened RB of each of the fifth OFDM symbol and the sixth OFDM symbol in the at least one even-numbered slot and are arranged at the first subcarrier, the fourth subcarrier, the seventh subcarrier and the tenth subcarrier in the shortened RB of each of the fifth OFDM symbol and the sixth OFDM symbol in the at least one odd-numbered slot, for the second antenna port, when the extended CP is used in each OFDM symbol in both the at least one even-numbered slot and the at least one odd-numbered slot.

Figure 13:
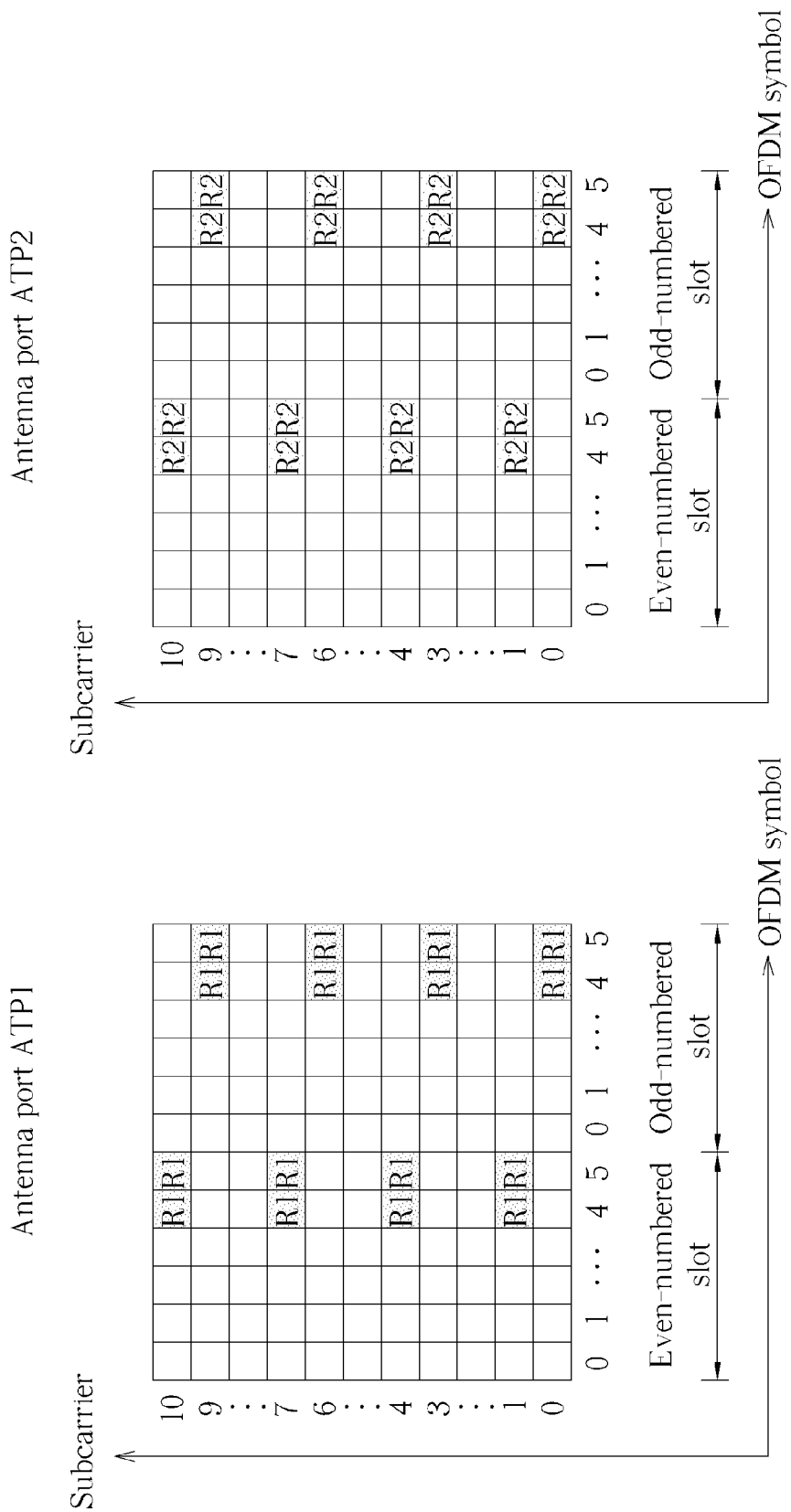
FIG. 13 is a schematic diagram of the shortened RB according to an example of the present invention.

In detail, please refer to FIG. 13, which is a schematic diagram of the shortened RB according to an example of the present invention. Reference signals R1 and R2 are transmitted via antenna ports ATP1 and ATP2, respectively, are shown in FIG. 13. Further, the reference signals R1 and R2 can be allocated in at least one even-numbered slot and at least one odd-numbered slot, and is not limited. Only one even-numbered slot and one odd-numbered slot are shown in FIG. 13 for simplicity. As shown in FIG. 12, the reference signals R1 are arranged at (4,1), (4,4), (4,7), (4,10), (5,1), (5,4), (5,7) and (5,10) of the even-number slot and (4,0), (4,3), (4,6), (4,9), (5,0), (5,3), (5,6) and (5,9) of the odd-number slot. The reference signals R2 are arranged at (4,1), (4,4), (4,7), (4,10), (5,1), (5,4), (5,7) and (5,10) of the even-number slot and (4,0), (4,3), (4,6), (4,9), (5,0), (5,3), (5,6) and (5,9) of the odd-number slot. When the reference signals R1 and R2 are transmitted at the same time, the reference signals R1 and R2 are preferably multiplexed by using the CDM. Preferably, the above example can be applied to all other DL subframe configurations specified in the 3GPP standard.

Please note that, when only one antenna port (e.g., the antenna port ATP1) is used for transmitting the reference signals, it is straightforward that only the reference signals R1 are transmitted, the right parts in FIGS. 7-13 are not needed and the CDM is not needed accordingly. Besides, the above examples are used for illustrating a situation where the last subcarrier is removed, i.e., subcarriers 0-10 are retained. When the first subcarrier is removed, i.e., subcarriers 1-11 are retained, the above example should be modified accordingly, i.e., a positive integer 1 is added to each subcarrier index in FIGS. 7-13.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 20.

To sum up, the present invention provides methods for handling a shortened resource block for a communication device (e.g., a MTC device), to solve misalignment of the DC subcarriers. Furthermore, new arrangements of reference signals are presented correspondingly for the shortened resource block. Thus, the MTC device can process the resource blocks regularly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of arranging a shortened resource block (RB) without a direct current (DC) subcarrier for a wireless communication system comprising a communication device and a network, the method comprising:
   selecting, by the communication device or the network, a RB from a plurality of RBs comprising a plurality of available subcarriers, according to a configuration, wherein the RB comprises a plurality of subcarriers; and
   removing, by the communication device or the network, the DC subcarrier from the plurality of subcarriers of the RB according to the configuration, to construct the shortened RB without the DC subcarrier, to solve misalignment of DC subcarriers of the communication device and a legacy communication device;
   wherein the configuration is determined according to a carrier frequency of the communication device;
   wherein a number of subcarriers of the shortened RB is less than a number of subcarriers of another RB in the plurality of RBs.

2. The method of claim 1, wherein the communication device is a machine type communication (MTC) device.

3. The method of claim 1, wherein the configuration is determined according to a maximum bandwidth supported by the communication device.

4. The method of claim 1, wherein the configuration is determined by the network, and is transmitted to the communication device via a higher layer signaling.

5. The method of claim 1, wherein the configuration comprises determining the last subcarrier of the RB as the DC subcarrier, when a maximum bandwidth supported by the communication device is one of 1.4 MHz, 10 MHz and 20 MHz, wherein the bandwidths of 1.4 MHz, 10 MHz and 20 MHz correspond to orthogonal frequency-division multiplexing (OFDM) symbols with fast Fourier transform (FFT) sizes of 128, 1024 and 2048, respectively.

6. The method of claim 5, wherein an index of the shortened RB is determined according to the following equation:

$$k' = \left\{ k_{DC} - \frac{N_{RB}^{DL} \times N_{SC}^{RB}}{2} + 1, \ldots, \right.$$

$$\left. k_{DC} - 1, k_{DC} + 1, \ldots, k_{DC} + \frac{N_{RB}^{DL} \times N_{SC}^{RB}}{2} \right\},$$

$$k = \text{reorder}(k'),$$

$$n_{PRB} = \begin{cases} \left\lfloor \frac{k}{N_{SC}^{RB}} \right\rfloor, & k < \frac{N_{RB}^{DL} \times N_{SC}^{RB}}{2} - 1 \\ \left\lfloor \frac{k+1}{N_{SC}^{RB}} \right\rfloor, & \text{else} \end{cases},$$

$$n_{PRB-Shortened} = \frac{N_{RB}^{DL}}{2} - 1;$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB-Shortened}$ is an index of the shortened RB.

7. The method of claim 1, wherein the configuration comprises determining the first subcarrier of the RB as the DC subcarrier, when a maximum bandwidth supported by the communication device is one of 1.4 MHz, 10 MHz and 20 MHz, wherein the bandwidths of 1.4 MHz, 10 MHz and 20 MHz correspond to OFDM symbols with FFT sizes of 128, 1024 and 2048, respectively.

8. The method of claim 7, wherein an index of the shortened RB is determined according to the following equation:

$$k' = \left\{ k_{DC} - \frac{N_{RB}^{DL} \times N_{SC}^{RB}}{2}, \ldots, \right.$$

$$\left. k_{DC} - 1, k_{DC} + 1, \ldots, k_{DC} + \frac{N_{RB}^{DL} \times N_{SC}^{RB}}{2} - 1 \right\}$$

$$k = \text{reorder}(k'),$$

$$n_{PRB} = \begin{cases} \left\lfloor \dfrac{k}{N_{SC}^{RB}} \right\rfloor, & k < \dfrac{N_{RB}^{DL} \times N_{SC}^{RB}}{2} \\ \dfrac{N_{RB}^{DL}}{2} + \left\lfloor \dfrac{k_-}{N_{SC}^{RB}} \right\rfloor, & \text{else} \end{cases},$$

$$\text{wherein } k_- = k - \frac{N_{RB}^{DL} \times N_{SC}^{RB}}{2} - 1,$$

$$n_{PRB-Shortened} = \frac{N_{RB}^{DL}}{2};$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB-Shortened}$ is an index of the shortened RB.

9. The method of claim 1, wherein the configuration comprises determining a middle subcarrier of the RB as the DC subcarrier, when a maximum bandwidth supported by the communication device is one of 3 MHz, 5 MHz and 15 MHz, wherein the bandwidths of 3 MHz, 5 MHz and 15 MHz correspond to OFDM symbols with FFT sizes of 256, 512 and 1536, respectively.

10. The method of claim 9, wherein an index of the shortened RB is determined according to the following equation:

$$k' = \left\{ k_{DC} - \frac{N_{RB}^{DL} \times N_{SC}^{RB}}{2} + 1, \ldots, \right.$$

$$\left. k_{DC} - 1, k_{DC} + 1, \ldots, k_{DC} + \frac{N_{RB}^{DL} \times N_{SC}^{RB}}{2} \right\} \text{ or }$$

$$k' = \left\{ k_{DC} - \frac{N_{RB}^{DL} \times N_{SC}^{RB}}{2}, \ldots, k_{DC} - 1, k_{DC} + 1, \right.$$

$$\left. \ldots, k_{DC} + \frac{N_{RB}^{DL} \times N_{SC}^{RB}}{2} - 1 \right\},$$

$$k = \text{reorder}(k'),$$

$$n_{PRB} = \begin{cases} \left\lfloor \dfrac{k}{N_{SC}^{RB}} \right\rfloor, & k < \dfrac{N_{RB}^{DL} \times N_{SC}^{RB}}{2} - 1 \\ \left\lfloor \dfrac{k+1}{N_{SC}^{RB}} \right\rfloor, & \text{else} \end{cases},$$

$$n_{PRB-Shortened} = \left\lfloor \frac{N_{RB}^{DL}}{2} \right\rfloor;$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB-Shortened}$ is an index of the shortened RB.

11. The method of claim 1, wherein a first plurality of reference signals are arranged at the first subcarrier, the sixth subcarrier and the eleventh subcarrier in the shortened RB of each of the third orthogonal frequency-division multiplexing (OFDM) symbol, the fourth OFDM symbol, the sixth OFDM symbol and the seventh OFDM symbol in at least one even-numbered slot for a first antenna port, when a normal cyclic prefix (CP) is used in each OFDM symbol in the at least one even-numbered slot.

12. The method of claim 11, wherein a second plurality of reference signals are arranged at the first subcarrier, the sixth subcarrier and the eleventh subcarrier in the shortened RB of each of the third OFDM symbol, the fourth OFDM symbol, the sixth OFDM symbol and the seventh OFDM symbol in the at least one even-numbered slot for a second antenna port, when the normal CP is used in each OFDM symbol in the at least one even-numbered slot.

13. The method of claim 1, wherein a first plurality of reference signals are arranged at the first subcarrier, the sixth subcarrier and the eleventh subcarrier in the shortened RB of each of the third OFDM symbols and the fourth OFDM symbols in at least one even-numbered slot and at least one odd-numbered slot for a first antenna port, when a normal CP is used in each OFDM symbol in both the at least one even-numbered slot and the at least one odd-numbered slot.

14. The method of claim 13, wherein a second plurality of reference signals are arranged at the first subcarrier, the sixth subcarrier and the eleventh subcarrier in the shortened RB of each of the third OFDM symbols and the fourth OFDM symbols in the at least one even-numbered slot and the at least one odd-numbered slot for a second antenna port, when the normal CP is used in each OFDM symbol in both the at least one even-numbered slot and the at least one odd-numbered slot.

15. The method of claim 1, wherein a first plurality of reference signals are arranged at the first subcarrier, the sixth subcarrier and the eleventh subcarrier in the shortened RB of each of the sixth OFDM symbols and the seventh OFDM symbols in at least one even-numbered slot and at least one odd-numbered slot for a first antenna port, when a normal CP is used in each OFDM symbol in both the at least one even-numbered slot and the at least one odd-numbered slot.

16. The method of claim 15, wherein a second plurality of reference signals are arranged at the first subcarrier, the sixth subcarrier and the eleventh subcarrier in the shortened RB of each of the sixth OFDM symbols and the seventh OFDM symbols in the at least one even-numbered slot and the at least one odd-numbered slot for a second antenna port, when the normal CP is used in each OFDM symbol in both the at least one even-numbered slot and the at least one odd-numbered slot.

17. The method of claim 1, wherein a first plurality of reference signals are arranged at the second subcarrier, the fifth subcarrier, the eighth subcarrier and the eleventh subcarrier in the shortened RB of each of the fifth OFDM symbol and the sixth OFDM symbol in at least one even-numbered slot for a first antenna port, when an extended CP is used in each OFDM symbol in the at least one even-numbered slot.

18. The method of claim 17, wherein a second plurality of reference signals are arranged at the second subcarrier, the fifth subcarrier, the eighth subcarrier and the eleventh subcarrier in the shortened RB of each of the fifth OFDM symbol and the sixth OFDM symbol in the at least one even-numbered slot for a second antenna port, when the extended CP is used in each OFDM symbol in the at least one even-numbered slot.

19. The method of claim 1, wherein a first plurality of reference signals are arranged at the first subcarrier, the fourth subcarrier, the seventh subcarrier and the tenth subcarrier in the shortened RB of each of the fifth OFDM symbol and the sixth OFDM symbol in at least one even-numbered slot for a first antenna port, when an extended CP is used in each OFDM symbol in the at least one even-numbered slot.

20. The method of claim 19, wherein a second plurality of reference signals are arranged at the first subcarrier, the fourth subcarrier, the seventh subcarrier and the tenth subcarrier in the shortened RB of each of the fifth OFDM symbol and the sixth OFDM symbol in the at least one even-numbered slot for a second antenna port, when the extended CP is used in each OFDM symbol in the at least one even-numbered slot.

21. The method of claim 1, wherein a first plurality of reference signals are arranged at the first subcarrier, the fourth subcarrier, the seventh subcarrier and the tenth subcarrier in the shortened RB of each of the fifth OFDM symbol and the sixth OFDM symbol in at least one even-numbered slot and are arranged at the second subcarrier, the fifth subcarrier, the eighth subcarrier and the eleventh subcarrier in the shortened RB of each of the fifth OFDM symbol and the sixth OFDM symbol in at least one odd-numbered slot, for a first antenna port, when an extended CP is used in each OFDM symbol in both the at least one even-numbered slot and the at least one odd-numbered slot.

22. The method of claim 21, wherein a second plurality of reference signals are arranged at the first subcarrier, the fourth subcarrier, the seventh subcarrier and the tenth subcarrier in the shortened RB of each of the fifth OFDM symbol and the sixth OFDM symbol in the at least one even-numbered slot and are arranged at the second subcarrier, the fifth subcarrier, the eighth subcarrier and the eleventh subcarrier in the shortened RB of each of the fifth OFDM symbol and the sixth OFDM symbol in the at least one odd-numbered slot, for a second antenna port, when the extended CP is used in each OFDM symbol in both the at least one even-numbered slot and the at least one odd-numbered slot.

23. The method of claim 1, wherein a first plurality of reference signals are arranged at the second subcarrier, the fifth subcarrier, the eighth subcarrier and the eleventh subcarrier in the shortened RB of each of the fifth OFDM symbol and the sixth OFDM symbol in at least one even-numbered slot and are arranged at the first subcarrier, the fourth subcarrier, the seventh subcarrier and the tenth subcarrier in the shortened RB of each of the fifth OFDM symbol and the sixth OFDM symbol in at least one odd-numbered slot, for a first antenna port, when an extended CP is used in each OFDM symbol in both the at least one even-numbered slot and the at least one odd-numbered slot.

24. The method of claim 23, wherein a second plurality of reference signals are arranged at the second subcarrier, the fifth subcarrier, the eighth subcarrier and the eleventh subcarrier in the shortened RB of each of the fifth OFDM symbol and the sixth OFDM symbol in the at least one even-numbered slot and are arranged at the first subcarrier, the fourth subcarrier, the seventh subcarrier and the tenth subcarrier in the shortened RB of each of the fifth OFDM symbol and the sixth OFDM symbol in the at least one odd-numbered slot, for a second antenna port, when the extended CP is used in each OFDM symbol in both the at least one even-numbered slot and the at least one odd-numbered slot.

25. A wireless communication system comprising a communication device and a network, for arranging a shortened resource block (RB) without a direct current (DC) subcarrier, the wireless communication system comprising:
 means for selecting a RB from a plurality of RBs comprising a plurality of available subcarriers, according to a configuration, wherein the RB comprises a plurality of subcarriers; and
 means for removing the DC subcarrier from the plurality of subcarriers of the RB according to the configuration, to construct the shortened RB without the DC subcarrier, to solve misalignment of DC subcarriers of the communication device and a legacy communication device;
 wherein the configuration is determined according to a carrier frequency of the communication device;
 wherein a number of subcarriers of the shortened RB is less than a number of subcarriers of another RB in the plurality of RBs.

26. The wireless communication system of claim 25, wherein the communication device is a machine type communication (MTC) device.

27. The wireless communication system of claim 25, wherein the configuration is determined according to at least one of a carrier frequency of the communication device and a maximum bandwidth supported by the communication device.

28. The wireless communication system of claim 25, wherein the configuration is determined by the network, and is transmitted to the communication device via a higher layer signaling.

29. The wireless communication system of claim 25, wherein the configuration comprises determining the last subcarrier of the RB as the DC subcarrier, when a maximum bandwidth supported by the communication device is one of 1.4 MHz, 10 MHz and 20 MHz, wherein the bandwidths of 1.4 MHz, 10 MHz and 20 MHz correspond to orthogonal frequency-division multiplexing (OFDM) symbols with fast Fourier transform (FFT) sizes of 128, 1024 and 2048, respectively.

30. The wireless communication system of claim 29, wherein an index of the shortened RB is determined according to the following equation:

$$k' = \left\{ k_{DC} - \frac{N_{RB}^{DL} \times N_{SC}^{RB}}{2} + 1, \ldots, \right.$$

$$\left. k_{DC} - 1, k_{DC} + 1, \ldots, k_{DC} + \frac{N_{RB}^{DL} \times N_{SC}^{RB}}{2} \right\},$$

$$k = \text{reorder}(k'),$$

$$n_{PRB} = \begin{cases} \left\lfloor \frac{k}{N_{SC}^{RB}} \right\rfloor, & k < \frac{N_{RB}^{DL} \times N_{SC}^{RB}}{2} - 1 \\ \left\lfloor \frac{k+1}{N_{SC}^{RB}} \right\rfloor, & \text{else} \end{cases},$$

$$n_{PRB-Shortened} = \frac{N_{RB}^{DL}}{2} - 1;$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB-Shortened}$ is an index of the shortened RB.

31. The wireless communication system of claim 25, wherein the configuration comprises determining the first subcarrier of the RB as the DC subcarrier, when a maximum bandwidth supported by the communication device is one of 1.4 MHz, 10 MHz and 20 MHz, wherein the bandwidths of 1.4 MHz, 10 MHz and 20 MHz correspond to OFDM symbols with FFT sizes of 128, 1024 and 2048, respectively.

32. The wireless communication system of claim 31, wherein an index of the shortened RB is determined according to the following equation:

$$k' = \left\{ k_{DC} - \frac{N_{RB}^{DL} \times N_{SC}^{RB}}{2}, \ldots , \right.$$

$$\left. k_{DC} - 1, k_{DC} + 1, \ldots , k_{DC} + \frac{N_{RB}^{DL} \times N_{SC}^{RB}}{2} - 1 \right\}$$

$$k = \mathrm{reorder}(k'),$$

$$n_{PRB} = \begin{cases} \left\lfloor \dfrac{k}{N_{SC}^{RB}} \right\rfloor, & k < \dfrac{N_{RB}^{DL} \times N_{SC}^{RB}}{2} \\ \dfrac{N_{RB}^{DL}}{2} + \left\lfloor \dfrac{k_{-}}{N_{SC}^{RB}} \right\rfloor, & \mathrm{else} \end{cases},$$

$$\text{wherein } k_{-} = k - \frac{N_{RB}^{DL} \times N_{SC}^{RB}}{2} - 1,$$

$$n_{PRB-Shortened} = \frac{N_{RB}^{DL}}{2};$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB-Shortened}$ is an index of the shortened RB.

33. The wireless communication system of claim 25, wherein the configuration comprises determining a middle subcarrier of the RB as the DC subcarrier, when a maximum bandwidth supported by the communication device is one of 3 MHz, 5 MHz and 15 MHz, wherein the bandwidths of 3 MHz, 5 MHz and 15 MHz correspond to OFDM symbols with FFT sizes of 256, 512 and 1536, respectively.

34. The wireless communication system of claim 33, wherein an index of the shortened RB is determined according to the following equation:

$$k' = \left\{ k_{DC} - \frac{N_{RB}^{DL} \times N_{SC}^{RB}}{2} + 1, \ldots , \right.$$

$$\left. k_{DC} - 1, k_{DC} + 1, \ldots , k_{DC} + \frac{N_{RB}^{DL} \times N_{SC}^{RB}}{2} \right\} \text{ or }$$

$$k' = \left\{ k_{DC} - \frac{N_{RB}^{DL} \times N_{SC}^{RB}}{2}, \ldots , k_{DC} - 1, \right.$$

$$\left. k_{DC} + 1, \ldots , k_{DC} + \frac{N_{RB}^{DL} \times N_{SC}^{RB}}{2} - 1 \right\},$$

$$k = \mathrm{reorder}(k'),$$

$$n_{PRB} = \begin{cases} \left\lfloor \dfrac{k}{N_{SC}^{RB}} \right\rfloor, & k < \dfrac{N_{RB}^{DL} \times N_{SC}^{RB}}{2} - 1 \\ \left\lfloor \dfrac{k+1}{N_{SC}^{RB}} \right\rfloor, & \mathrm{else} \end{cases},$$

$$n_{PRB-Shortened} = \left\lfloor \frac{N_{RB}^{DL}}{2} \right\rfloor;$$

wherein k' are indices of the plurality of available subcarriers, $k_{DC}$ is an index of the DC subcarrier, $N_{RB}^{DL}$ is a number of the plurality of RBs, $N_{SC}^{RB}$ is a number of subcarriers of each of the plurality of RBs, reorder (k') is a reorder operation compressing k' to be continuous in the same order and to start from the zero, $n_{PRB}$ are indices of the plurality of RBs, and $n_{PRB-Shortened}$ is an index of the shortened RB.

35. The wireless communication system of claim 25, wherein a first plurality of reference signals are arranged at the first subcarrier, the sixth subcarrier and the eleventh subcarrier in the shortened RB of each of the third orthogonal frequency-division multiplexing (OFDM) symbol, the fourth OFDM symbol, the sixth OFDM symbol and the seventh OFDM symbol in at least one even-numbered slot for a first antenna port, when a normal cyclic prefix (CP) is used in each OFDM symbol in the at least one even-numbered slot.

36. The wireless communication system of claim 35, wherein a second plurality of reference signals are arranged at the first subcarrier, the sixth subcarrier and the eleventh subcarrier in the shortened RB of each of the third OFDM symbol, the fourth OFDM symbol, the sixth OFDM symbol and the seven OFDM symbol in the at least one even-numbered slot for a second antenna port, when the normal CP is used in each OFDM symbol in the at least one even-numbered slot.

37. The wireless communication system of claim 25, wherein a first plurality of reference signals are arranged at the first subcarrier, the sixth subcarrier and the eleventh subcarrier in the shortened RB of each of the third OFDM symbols and the fourth OFDM symbols in at least one even-numbered slot and at least one odd-numbered slot for a first antenna port, when a normal CP is used in each OFDM symbol in both the at least one even-numbered slot and the at least one odd-numbered slot.

38. The wireless communication system of claim 37, wherein a second plurality of reference signals are arranged at the first subcarrier, the sixth subcarrier and the eleventh subcarrier in the shortened RB of each of the third OFDM symbols and the fourth OFDM symbols in the at least one even-numbered slot and the at least one odd-numbered slot for a second antenna port, when the normal CP is used in each OFDM symbol in both the at least one even-numbered slot and the at least one odd-numbered slot.

39. The wireless communication system of claim 25, wherein a first plurality of reference signals are arranged at the first subcarrier, the sixth subcarrier and the eleventh subcarrier in the shortened RB of each of the sixth OFDM symbols and the seventh OFDM symbols in at least one even-numbered slot and at least one odd-numbered slot for a first antenna port, when a normal CP is used in each OFDM symbol in both the at least one even-numbered slot and the at least one odd-numbered slot.

40. The wireless communication system of claim 39, wherein a second plurality of reference signals are arranged at the first subcarrier, the sixth subcarrier and the eleventh subcarrier in the shortened RB of each of the sixth OFDM symbols and the seventh OFDM symbols in the at least one even-numbered slot and the at least one odd-numbered slot for a second antenna port, when the normal CP is used in each OFDM symbol in both the at least one even-numbered slot and the at least one odd-numbered slot.

41. The wireless communication system of claim 25, wherein a first plurality of reference signals are arranged at the second subcarrier, the fifth subcarrier, the eighth subcarrier and the eleventh subcarrier in the shortened RB of each of the fifth OFDM symbol and the sixth OFDM symbol in at least one even-numbered slot for a first antenna port, when an extended CP is used in each OFDM symbol in the at least one even-numbered slot.

42. The wireless communication system of claim 41, wherein a second plurality of reference signals are arranged at the second subcarrier, the fifth subcarrier, the eighth subcarrier and the eleventh subcarrier in the shortened RB of each of the fifth OFDM symbol and the sixth OFDM symbol in the at least one even-numbered slot for a second antenna port, when the extended CP is used in each OFDM symbol in the at least one even-numbered slot.

43. The wireless communication system of claim 25, wherein a first plurality of reference signals are arranged at the first subcarrier, the fourth subcarrier, the seventh subcarrier and the tenth subcarrier in the shortened RB of each of the fifth OFDM symbol and the sixth OFDM symbol in at least one even-numbered slot for a first antenna port, when an extended CP is used in each OFDM symbol in the at least one even-numbered slot.

44. The wireless communication system of claim 43, wherein a second plurality of reference signals are arranged at the first subcarrier, the fourth subcarrier, the seventh subcarrier and the tenth subcarrier in the shortened RB of each of the fifth OFDM symbol and the sixth OFDM symbol in the at least one even-numbered slot for a second antenna port, when the extended CP is used in each OFDM symbol in the at least one even-numbered slot.

45. The wireless communication system of claim 25, wherein a first plurality of reference signals are arranged at the first subcarrier, the fourth subcarrier, the seventh subcarrier and the tenth subcarrier in the shortened RB of each of the fifth OFDM symbol and the sixth OFDM symbol in at least one even-numbered slot and are arranged at the second subcarrier, the fifth subcarrier, the eighth subcarrier and the eleventh subcarrier in the shortened RB of each of the fifth OFDM symbol and the sixth OFDM symbol in at least one odd-numbered slot, for a first antenna port, when an extended CP is used in each OFDM symbol in both the at least one even-numbered slot and the at least one odd-numbered slot.

46. The wireless communication system of claim 45, wherein a second plurality of reference signals are arranged at the first subcarrier, the fourth subcarrier, the seventh subcarrier and the tenth subcarrier in the shortened RB of each of the fifth OFDM symbol and the sixth OFDM symbol in the at least one even-numbered slot and are arranged at the second subcarrier, the fifth subcarrier, the eighth subcarrier and the eleventh subcarrier in the shortened RB of each of the fifth OFDM symbol and the sixth OFDM symbol in the at least one odd-numbered slot, for a second antenna port, when the extended CP is used in each OFDM symbol in both the at least one even-numbered slot and the at least one odd-numbered slot.

47. The wireless communication system of claim 25, wherein a first plurality of reference signals are arranged at the second subcarrier, the fifth subcarrier, the eighth subcarrier and the eleventh subcarrier in the shortened RB of each of the fifth OFDM symbol and the sixth OFDM symbol in at least one even-numbered slot and are arranged at the first subcarrier, the fourth subcarrier, the seventh subcarrier and the tenth subcarrier in the shortened RB of each of the fifth OFDM symbol and the sixth OFDM symbol in at least one odd-numbered slot, for a first antenna port, when an extended CP is used in each OFDM symbol in both the at least one even-numbered slot and the at least one odd-numbered slot.

48. The wireless communication system of claim 47, wherein a second plurality of reference signals are arranged at the second subcarrier, the fifth subcarrier, the eighth subcarrier and the eleventh subcarrier in the shortened RB of each of the fifth OFDM symbol and the sixth OFDM symbol in the at least one even-numbered slot and are arranged at the first subcarrier, the fourth subcarrier, the seventh subcarrier and the tenth subcarrier in the shortened RB of each of the fifth OFDM symbol and the sixth OFDM symbol in the at least one odd-numbered slot, for a second antenna port, when the extended CP is used in each OFDM symbol in both the at least one even-numbered slot and the at least one odd-numbered slot.

* * * * *